(12) United States Patent
Cheng

(10) Patent No.: US 10,093,375 B1
(45) Date of Patent: Oct. 9, 2018

(54) FAST COMBINATION STRUCTURE FOR BICYCLE REAR SHELF AND LUGGAGE BAG

(71) Applicants: Eli International Enterprise Co., Ltd., Changhua County (TW); Pao-Chin Cheng Chen, Changhua County (TW)

(72) Inventor: Yuan-Lin Cheng, Changhua County (TW)

(73) Assignees: ELI INTERNATIONAL ENTERPRISE CO., LTD., Changhua County (TW); Pao-Chin Cheng Chen, Changhua County (TW)

( * ) Notice: Subject to any disclaimer, the term of this patent is extended or adjusted under 35 U.S.C. 154(b) by 0 days.

(21) Appl. No.: 15/866,478

(22) Filed: Jan. 10, 2018

(51) Int. Cl.
*B62J 7/04* (2006.01)
*B62J 9/00* (2006.01)

(52) U.S. Cl.
CPC .................. *B62J 7/04* (2013.01); *B62J 9/001* (2013.01)

(58) Field of Classification Search
CPC ......... B62J 7/04; B62J 7/02; B62J 7/06; B62J 7/08; B62J 9/001; B62J 9/003; B62J 9/006
See application file for complete search history.

(56) References Cited

U.S. PATENT DOCUMENTS

| | | | | | |
|---|---|---|---|---|---|
| 4,266,703 | A | * | 5/1981 | Litz | B62J 9/001 224/413 |
| 4,350,361 | A | * | 9/1982 | Fujii | B62J 7/06 224/422 |
| 5,551,609 | A | * | 9/1996 | Best | B62J 7/04 224/440 |
| 5,649,657 | A | * | 7/1997 | Chuang | B62J 7/00 224/430 |
| 5,860,577 | A | * | 1/1999 | Dunn | B62J 7/04 224/427 |
| 5,931,361 | A | * | 8/1999 | Schwimmer | B62J 7/04 224/418 |
| 6,398,247 | B1 | * | 6/2002 | Kuo | B62J 7/04 224/427 |
| 9,187,142 | B2 | * | 11/2015 | McKenzie | B62J 7/04 |
| 2006/0196322 | A1 | * | 9/2006 | Chuang | B62J 7/04 81/177.85 |
| 2008/0011031 | A1 | * | 1/2008 | Chuang | B62H 5/00 70/233 |
| 2011/0132949 | A1 | * | 6/2011 | Vitanza | B62J 7/04 224/440 |

* cited by examiner

*Primary Examiner* — Corey Skurdal
(74) *Attorney, Agent, or Firm* — Leong C. Lei

(57) ABSTRACT

A fast combination structure for a bicycle rear shelf and luggage bag, includes a rear shelf and a luggage bag; the rear shelf has a connection device, shelf body and adjustment unit, where the rear shelf is coupled to a bicycle seat tube through the connection device, and the self body is configured with a slide groove and perforated slot; the adjustment unit has an adjustment element, latching unit and pull rod, where the adjustment element is configured with an accommodation groove in which the latching unit is installed, the pull rod is passed through the accommodation groove and connected to the latching unit, and a return spring is positioned therebetween; the lower side of the luggage bag has a slide device having slide wings and a plurality of buckling holes each allowing the latching unit to be inserted in to fix the luggage bag.

2 Claims, 4 Drawing Sheets

FAST COMBINATION STRUCTURE FOR BICYCLE REAR SHELF AND LUGGAGE BAG

(a) TECHNICAL FIELD OF THE INVENTION

The present invention relates to an accessory equipped on a bicycle, and more particularly to a fast combination structure for a bicycle rear shelf and luggage bag.

(b) DESCRIPTION OF THE PRIOR ART

Current bicycles are used on daily transportation, sports or outdoor leisure. Bicycles has no much accommodation space because of their smaller volumes compared to automobiles and motorcycles; when a user needs to carry belongings, they usually install an additional storage device on a predetermined position of a bicycle frame, for example, a large luggage bag assembled on the rear shelf of the bicycle, or a small luggage bag assembled on a frame tube. Such kinds of luggage bags mainly have left, right bag bodies sewn to the self or frame tube with a cloth so that the luggage bag can be placed across the shelf or frame tube, providing the user with a function of carrying articles conveniently.

Conventional luggage bags are mostly compressed and fixed by spring clips configured on the shelf, but if they are too large in volume, the spring clips will not be able to compress and therefore fix the luggage bags tightly.

There is another rear shelf is provided to fix a luggage bag on it with a male and female Velcro. But, to disadvantage, a user must do the reassembly and alignment of the luggage bag, and the position of the luggage bag cannot be adjusted properly every time the luggage bag is used. On the contrary, the luggage bag will interfere with user's riding.

SUMMARY OF THE INVENTION

The main object of the present invention is to provide a fast combination structure for a bicycle rear shelf and luggage bag, configuring said rear shelf with a slide groove and a latching unit adapted for connection and positioning, and configuring the luggage bag with a slide unit and fixing groove, allowing the luggage bag to be slid on the rear shelf and adjusted to position, thereby achieving convenient position adjustment and use.

To achieve the object mentioned above, the present invention proposes a fast combination structure for a bicycle rear shelf and luggage bag, including a rear shelf and luggage bag; the rear shelf including a connection device, shelf body and adjustment unit, the rear shelf coupled to a bicycle seat tube through the connection device, the shelf body being a plate body on which a slide groove is configured, and the shelf body configured with a perforated slot; the adjustment unit having an adjustment element, latching unit and pull rod, the adjustment element assembled between the connection device and shelf body, the adjustment element configured with an accommodation groove, the latching unit installed in the accommodation groove and another side thereof passed through the perforated slot, the pull rod passed through the accommodation groove from below the adjustment element and in connection with the latching unit, and a return spring positioned between the latching unit and pull rod; and the luggage bag adapted to carry items, a lower side of the luggage bag having a slide device having slide wings capable of guiding the slide device to slide on the slide groove, and the slide device having a plurality of buckling holes each allowing the latching unit to be inserted therein, thereby fixing the luggage bag.

It can be seen from the description mentioned above, the present invention has the following advantages compared to the prior art:

1. the luggage bag can be assembled on the rear shelf fast; the luggage bag is slid on the rear shelf through the slide device, capable of fast positioning, and the slide groove in engagement with the slide device and the latching unit in engagement with the slide device achieve fast combination; and
2. the luggage bag can be adjusted to a proper position and fixed there without interfering with a bicycle riding action, allowing it to be smooth.

DETAILED DESCRIPTION OF THE PREFERRED EMBODIMENTS

Figure 1:
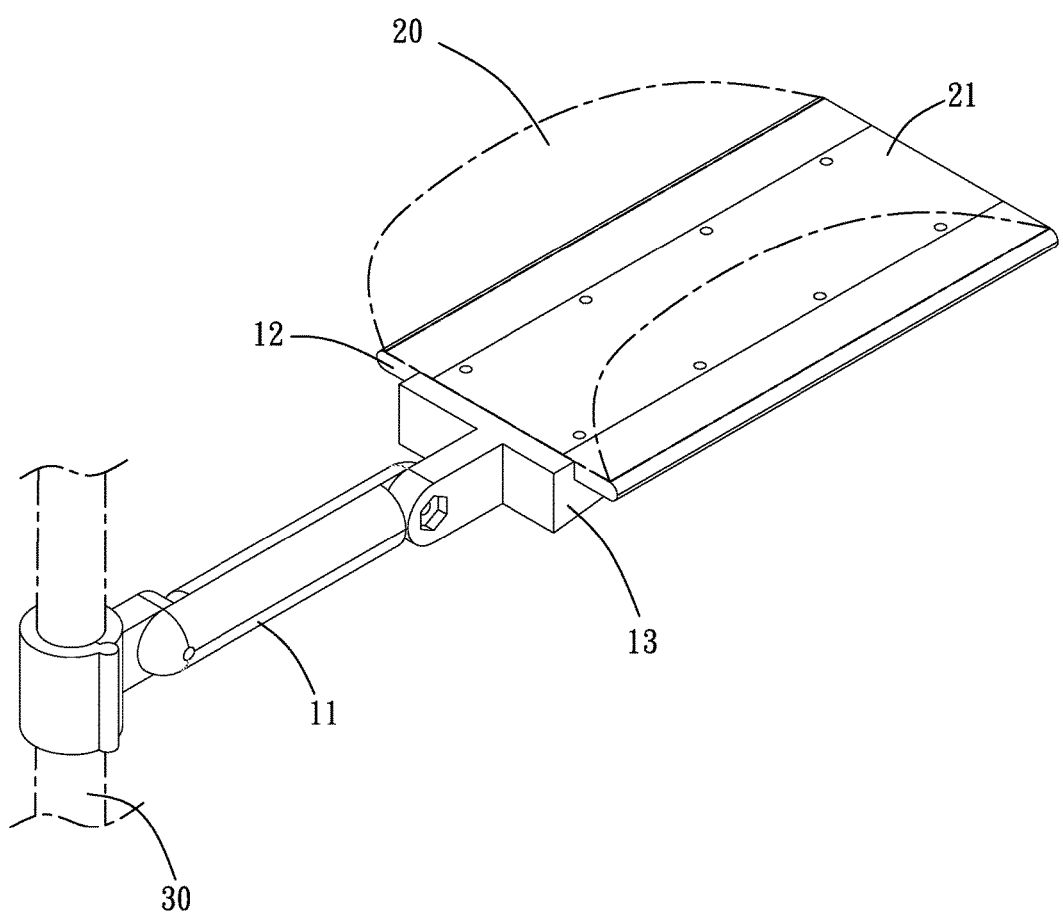
FIG. 1 is a perspective view of the present invention'
Figure 2:
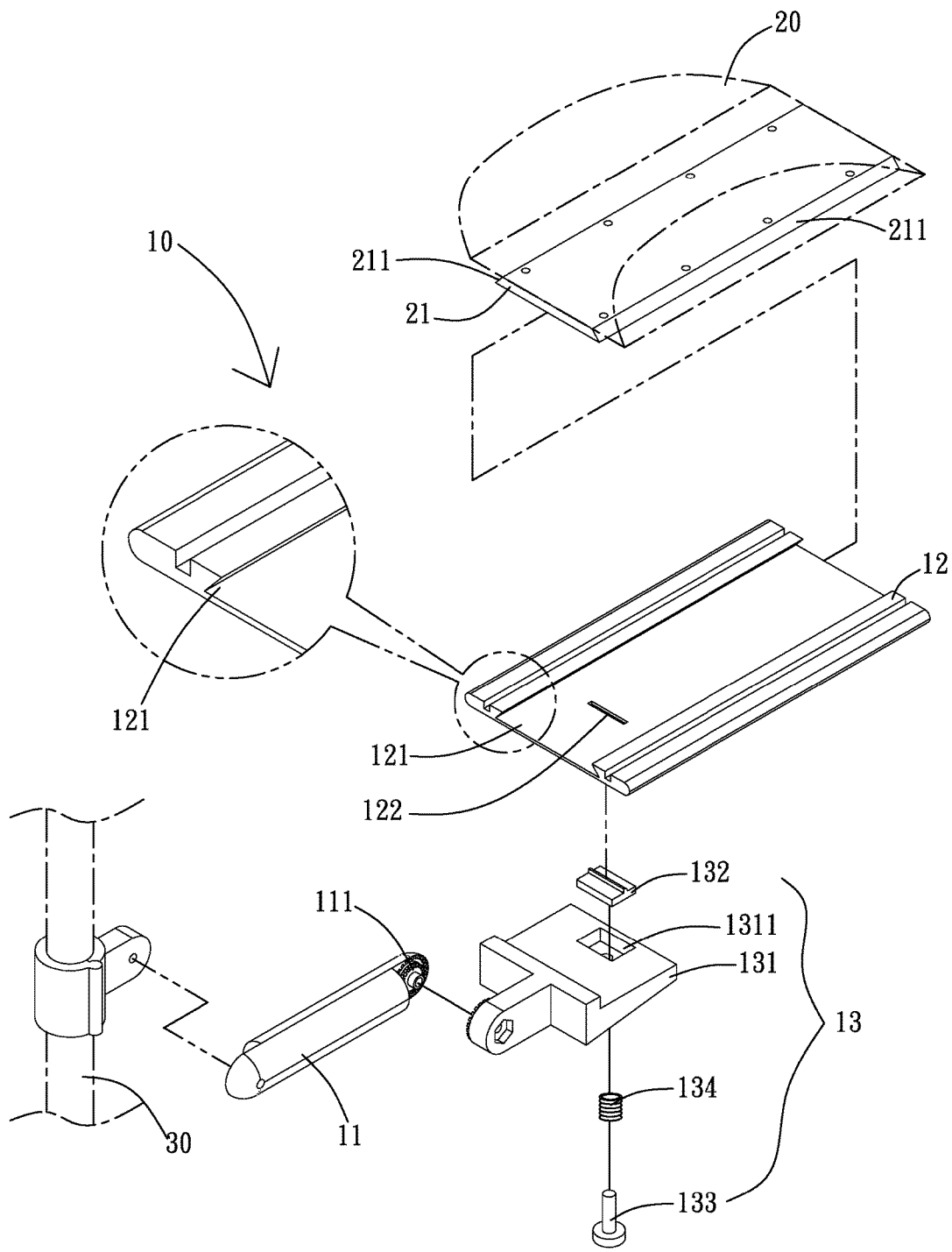
FIG. 2 is an exploded view of the present invention.
Figure 3:
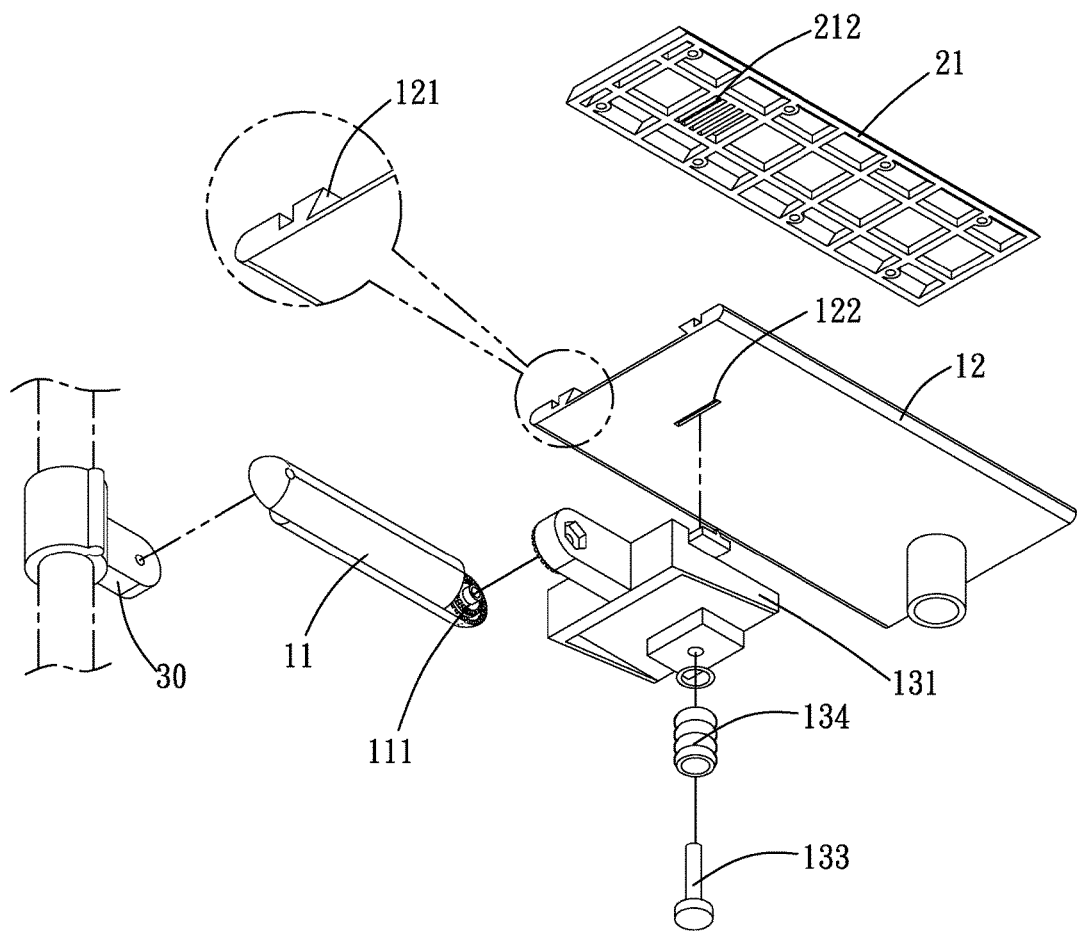
FIG. 3 is an exploded view of the present invention viewed from another angle.
Figure 4:
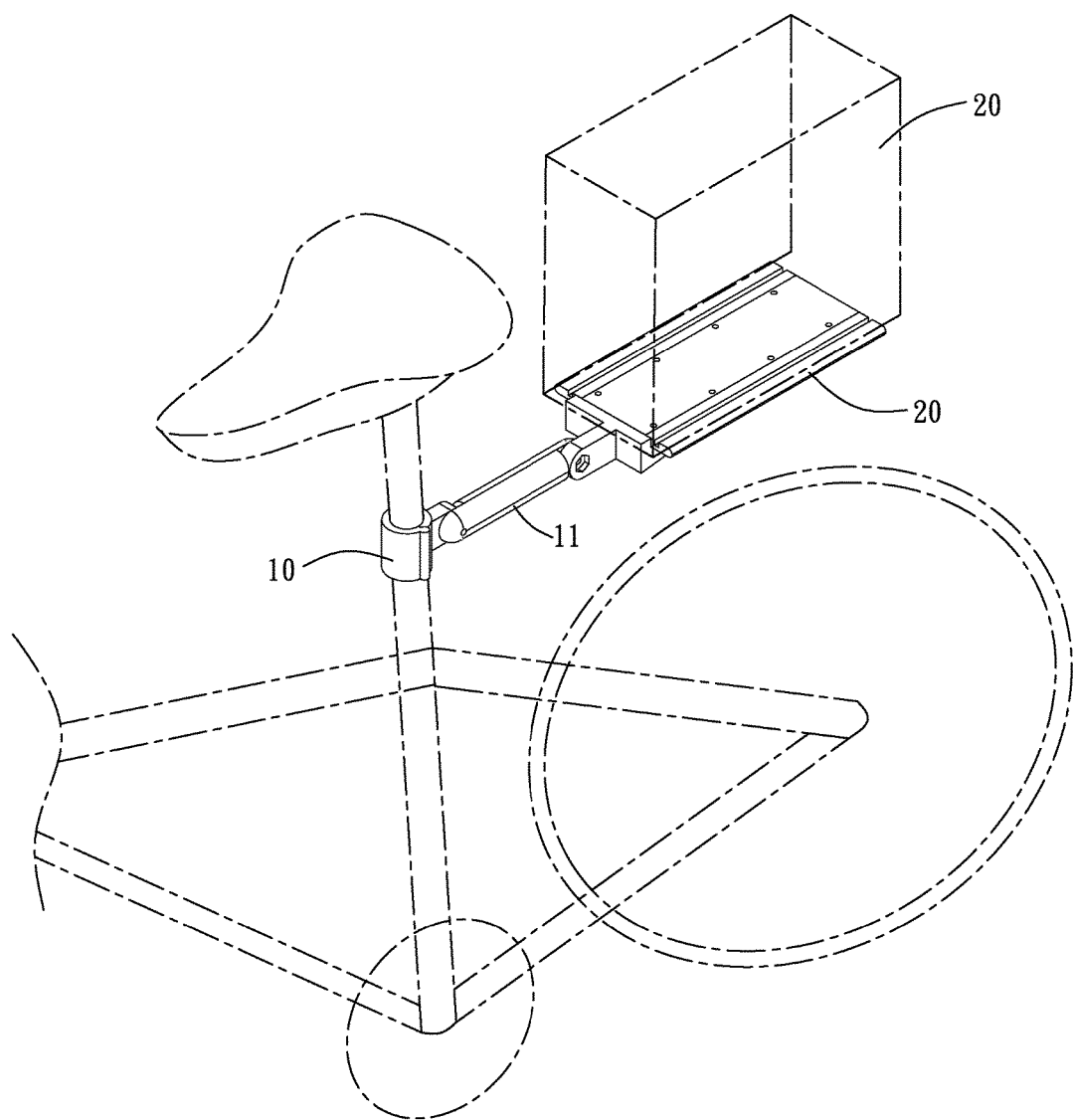
FIG. 4 is a schematically perspective view of the present invention in a use state.

Referring to FIGS. 1 to 4, a fast combination structure for a bicycle rear shelf and luggage bag of the present invention includes a rear shelf 10 and luggage bag 20.

The rear shelf 10 includes a connection device 11, shelf body 12 and adjustment unit 13, where the rear shelf 10 is coupled to a bicycle seat tube 30 through the connection device 11. In some preferred embodiments, the connection device 11 is configured with a tooth-typed adjustment structure 111, capable of adjusting the position of the rear shelf 10 gradually when the rear shelf 10 is adjusted. In addition, the connection device 11 has a non-return portion (not shown in the figures) capable of preventing the shelf body 12 from drooping due to the weight thereof after the connection device 11 is used for a long time, where the shelf body 12 is a plate body on which a slide groove 121 is configured. In the embodiment, the slide groove 21 is configured on the center of the shelf body 12, and the shelf body 12 is configured with a perforated slot 122. Furthermore, the adjustment unit 13 has an adjustment element 131, a latching unit 132 and a pull rod 133, where the adjustment element 131 is assembled between the connection device 11 and shelf body 12, and the adjustment element 131 is configured with an accommodation groove 1311 in which the latching unit 132 is assembled and another side of the latching unit 132 is passed through the perforated slot 122. Furthermore, the pull rod 13 is passed through the accommodation groove 1311 from below the adjustment element 131 and in connection with the latching unit 132. In addition, a return spring is positioned between the latching unit 132 and pull rod 133.

The luggage bag 20 is used to carry items, the lower side of which is configured with a slide device 21 having slide wings 211 used to guide the slide device 21 to slide on the slide groove 121. Furthermore, the slide device 21 has a plurality of buckling holes 212 each allowing the latching unit 132 to be inserted therein, thereby fixing the luggage bag 20, where the slide device 21 may be fixed on the lower side of the luggage bag 20 by means of sewing or buckling.

The connection device 11, shelf body 12 and adjustment unit 13 are assembled into one body in advance upon the practical use of the present invention. Thereafter, the connection device 11 of the rear shelf 10 is coupled to a bicycle seat tube 30, which can then complete the assembly of the rear shelf 10 on a bicycle. Next, the luggage bag 20 is guided to slide on the rear shelf 10 through the slide device 21, and the pull rod 133 is pulled to cause the latching unit 132 to be lowered. After a user confirms the position of the luggage bag 20, the return spring 134 is released to spring back to allow the latching unit 132 to be in engagement with one of the buckling holes 212 of the slide device 21, thereby completing the easy assembly of the luggage bag 20 on the rear shelf 10. Therefore, a user may couple the luggage bag 20 having a different volume and modeling stably to the rear shelf 10, and may adjust the position of the luggage bag 20 to make the riding action more stable.

I claim:

1. A fast combination structure for a bicycle rear shelf and luggage bag, comprising a rear shelf and luggage bag;
    said rear shelf comprising a connection device, shelf body and adjustment unit, said rear shelf coupled to a bicycle seat tube through said connection device, said shelf body being a plate body on which a slide groove is configured, and said shelf body configured with a perforated slot; said adjustment unit having an adjustment element, latching unit and pull rod, said adjustment element assembled between said connection device and shelf body, said adjustment element configured with an accommodation groove, said latching unit installed in said accommodation groove and another side thereof passed through said perforated slot, said pull rod passed through said accommodation groove from below said adjustment element and in connection with said latching unit, and a return spring positioned between said latching unit and pull rod; and
    said luggage bag adapted to carry items, a lower side of said luggage bag having a slide device having slide wings capable of guiding said slide device to slide on said slide groove, and said slide device having a plurality of buckling holes each allowing said latching unit to be inserted therein, thereby fixing said luggage bag.

2. The structure according to claim 1, wherein said connection device is configured with a tooth-typed adjustment structure, allowing a position of said rear shelf to be adjusted gradually when said rear shelf is adjusted, and said connection device has a non-return portion.

* * * * *